United States Patent [19]
Tanaka et al.

[11] Patent Number: 4,808,390
[45] Date of Patent: Feb. 28, 1989

[54] PROCESS FOR CONVERTING $UF_6$ INTO $UO_2$

[75] Inventors: Hiroshi Tanaka; Akio Umemura, both of Saitama, Japan

[73] Assignee: Mitsubishi Kinzoku Kabushiki Kaisha, Tokyo, Japan

[21] Appl. No.: 869,665

[22] Filed: Jun. 2, 1986

[30] Foreign Application Priority Data

Jun. 4, 1985 [JP] Japan .............................. 60-121292

[51] Int. Cl.[4] ..................... C01G 43/025; C01G 43/06
[52] U.S. Cl. .................................. 423/261; 423/253; 423/260; 423/19
[58] Field of Search ................... 423/261, 253, 260, 19

[56] References Cited

U.S. PATENT DOCUMENTS

| | | | |
|---|---|---|---|
| 3,477,830 | 11/1969 | Hackstein et al. | 423/261 |
| 3,765,844 | 10/1973 | Rode | 423/19 |
| 3,906,081 | 9/1975 | Welty | 423/261 |
| 4,020,146 | 4/1977 | Knudsen | 423/261 |
| 4,120,936 | 10/1978 | DeLuca et al. | 423/261 |

Primary Examiner—Teddy S. Gron
Assistant Examiner—Virginia B. Caress
Attorney, Agent, or Firm—Edward J. Brenner

[57] ABSTRACT

A process for converting $UF_6$ gas into $UO_2$ powder comprising blowing $UF_6$ gas and steam into a fluid bed to produce $UO_2F_2$ particle, hydrating and dehydrating the $UO_2F_2$ particle to $UO_2F_2$ powder, and defluorinating and reducing the $UO_2F_2$ powder to $UO_2$ powder. The $UO_2$ powder is suitable for manufacturing a reactor fuel owing to its high activity, low remaining fluorine amount and excellent fluidity.

3 Claims, 1 Drawing Sheet

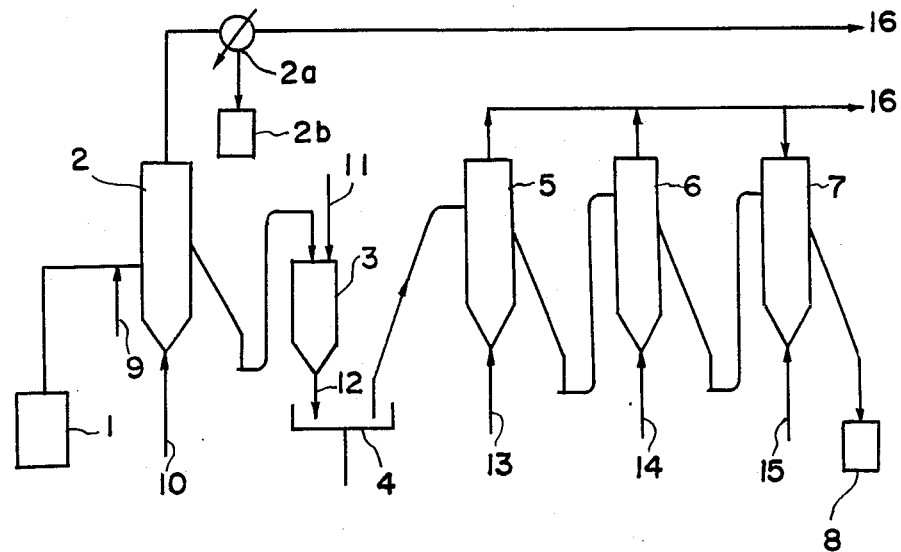

PROCESS FOR CONVERTING UF₆ INTO UO₂

BACKGROUND OF THE INVENTION

The present invention relates to a process for converting UF$_6$ gas into UO$_2$ powder which is suitable for manufacturing a reactor fuel owing to its high activity, low remaining fluorine amount and excellent fluidity.

As a process for converting UF$_6$ gas into UO$_2$ powder for a reactor fuel, there have been conventionally two processes, that is, a wet process and a dry process. The wet process is a process in which an uranyl ion containing solution is obtained by hydrolyzing UF$_6$ in gas-liquid reaction, then the solution is added with reagent to be precipitated, and the precipitate is filtered, dried roasted, reduced to be UO$_2$ powder. The UO$_2$ powder obtained by the wet process is high in activity and low in remaining fluorine amount, but it is defective in that there are many steps which are complex and the generated volume of waste liquid is large. Especially, large load in the filtering step, low filterbility of the precipitate and uranium loss into the filtrate have been already pointed out.

On the other hand, in the case of the dry process, there is a process using a rotary kiln, a process using a fluid bed reaction apparatus and a process using a flame combustion reaction apparatus. Of these processes, the process using a fluid bed reaction apparatus forms UO$_2$ powder as a product which has a very excellent fluidity, thus making the handling of UO$_2$ powder in following steps very easy, as compared with the other processes. The UO$_2$ powders obtained by almost all the conventional processes are bad in fluidity, so their handlings in the following steps are not easy.

As above described, in the process using a fluid bed reaction apparatus, there is obtained UO$_2$ powder having an excellent fluidity thus making handling of the UO$_2$ powder in the following steps very easy, but the activity of the UO$_2$ powder becomes smaller and the remaining fluorine amount thereof becomes larger, as compared with these of the other processes. This lowering of the activity of the UO$_2$ powder is due to formation of UO$_2$F$_2$ by gas phase reaction of UF$_6$ gas with steam as shown in the following equation (1) and formation of UF$_4$ by conversion into UO$_2$ of UO$_2$F$_2$ with hydrogen gas as shown in the following equation (2).

In the conventional dry process, especially in the process using a fluid bed reaction apparatus, the conversion of UF$_6$ gas into UO$_2$ powder is following two stage reactions.

$$UF_6 + 2H_2O \rightarrow UO_2F_2 + 4HF \qquad (1)$$

$$UO_2F_2 + H_2 \rightarrow UO_2 + 2HF \qquad (2)$$

In this process, a reverse reaction of equation (2) is apt to form UF$_4$.

$$UO_2 + 4HF \rightarrow UF_4 + 2H_2O \qquad (3)$$

UF$_4$ is a substance which is apt to sinter at relatively low temperature (about 1000° C.) and it begins to sinter at the operating temperature of equation (2) to hinder a deflorinating reaction which is important for lowering a remaining fluorine amount of UO$_2$ powder as a product. Therefore, it was formerly required to add in excess of steam in equation (2) to make equation (3) not occur. As a result, the operation became more complex and at the same time the excess added steam increased the amount of waste liquid. Further, as a long time was required for deflourinating the UO$_2$ powder as a product, it was exposed to the high temperature for a long time. Consequently, activity of the UO$_2$ powder is apt to be largely reduced.

Further, another defect of the case in which the fluid bed reaction apparatus is used relates to the operational stability of the fluid bed. Namely, the UO$_2$F$_2$ particles form the fluid bed, but UF$_6$ gas blown into the fluid bed reacts with steam as a fluidizing gas introduced through the bottom of the fluid bed to form UO$_2$F$_2$ which sticks on the surface of UO$_2$F$_2$ particles already existing. As the result, the thus sticky UO$_2$F$_2$ causes growth of the UO$_2$F$_2$ particles. On the other hand, a part of the UO$_2$F$_2$ particles are pulverized by abrasion owing to collison with other UO$_2$F$_2$ particles. The mean particle size of the UO$_2$F$_2$ particle is determined by these balances, but in the conventional fluid bed reaction apparatus, the resultant UO$_2$F$_2$ particles are apt to grow very large. Therefore, it was required to supply new UO$_2$F$_2$ powder into the fluid bed to maintain a stable operation of the fluid bed. Consequently, the apparatus system became complex and the operation was complicated.

BRIEF SUMMARY OF THE INVENTION

An object of the present invention is to provide a process for converting UF$_6$ gas into UO$_2$ powder in dry phase in which the resultant UO$_2$ powder is suitable for a reactor fuel owing to its high activity, low remaining fluorine amount and excellent fluidity.

According to the present invention, there is provided a process for converting UF$_6$ gas into UO$_2$ particle comprising combining (a) a first step of blowing UF$_6$ gas and steam into a fluid bed reaction apparatus to convert said UF$_6$ gas into UO$_2$F$_2$ particle.

(b) a second step of reacting said UO$_2$F$_2$ particle from the first step with ammonia water solution to change said UO$_2$F$_2$ particle to ADU (ammonium diuranate).

(c) a third step of drying and dehydrating said product of the second step, (d) a fourth step of reacting said product of the third step with hydrogen gas or hydrogen gas and steam to convert said product into UO$_2$ powder.

Further, according to the present invention, there is also provided a process for converting UF$_6$ gas into UO$_2$ powder comprising combining (a) a first step of blowing UF$_6$ gas and steam into a fluid bed reaction apparatus to convert said UF$_6$ gas into UO$_2$F$_2$ particle, (b) a second step of reacting said UO$_2$F$_2$ particle from the first step with ammonia water solution to convert said UO$_2$F$_2$ particle to ADU, (c) a third step of drying and dehydrating said product of the second step, (d) a fourth step of reacting said product of the third step to convert said product into UO$_3$ and/or U$_3$O$_8$ (e) a fifth step of reacting said UO$_3$ and/or U$_3$O$_8$ with hydrogen gas and/or hydrogen gas and steam to convert said UO$_3$ and/or U$_3$O$_8$ into UO$_2$ powder.

In the present invention, blowing of UF$_6$ gas and steam into the fluid bed reaction apparatus can be carried out more effectively by using a binary fluid nozzle.

In the present invention, the third step of drying and dehydrating said product of the second step and the fourth step of reacting said product of the third step with hydrogen gas or hydrogen gas and steam to convert said product into $UO_2$ powder can be carried out favorably by using a relatively corresponding fluid bed reaction apparatus.

Further, in the present invention, the third step of drying and dehydrating said product of the second stepk, the fourth step of reacting said product of the third step with steam to convert said product into $UO_3$ and/or $U_3O_8$, and the fifth of reacting said $UO_3$ and/or $U_3O_8$ with hydrogen gas or hydrogen gas and steam to convert said $UO_3$ and/or $U_3O_8$ into $UO_2$ can be also similarly carried out favorably by using a relatively corresponding fluid bed reaction apparatus.

DETAILED DESCRIPTION OF THE INVENTION

The features of the present invention are first, in the fluid bed reaction apparatus, $UO_2F_2$ particle is obtained by gas phase reaction of $UF_6$ gas with steam, and secondly ADU is obtained by reacting the $UO_2F_2$ particle with ammonia water solution, thereby avoiding the defects of the conventional wet process, that is, a bad filterability of the ADU precipitate, a large quantity of uranium loss into the filtrate and a vast volume of waste liquid generated improved.

This is due to the fact that in the present invention, as the resultant $UO_2$ powder inherits the same shape as that of the $UO_2F_2$ particle formed by the first step, the filtering operation becomes very easy and the greater part of HF of which the whole quantity transfered into the filtrate in the conventional wet process can be recovered as a HF water solution which can be reutilized in the first step.

Further, in the present invention, by carrying out the reaction of the second step by atomizing ammonia water solution, the filtering step can be omitted.

Further more, the present invention can solve the laarge defect of the conventional wet case in which $UF_6$ is converted into $UO_2$ by using the fluid bed reaction apparatus, that is, the low activity of the $UO_2$ powder formed and the slow defluorinating velocity thereof which make the $UO_2$ powder not suitable for manufacturing a reactor fuel. It can also utilize effectively the great merit of the wet process in which $UO_2$ powder having an excellent fluidity is obtained.

Namely, the present invention possesses a fundamental condition suitable for manufacturing a reactor fuel, that is, an easy defluorination of $UO_2$ powder and a high activity thereof and at the same time makes the fluidity of $UO_2$ powder very excellent by solving the defect of the wet process. This makes handling of $UO_2$ powder in the following steps very easy and further eliminates a pelletizing operation which is usually carried out in the manufacturing of $UO_2$ pellet for a rector fuel.

Further, in the present invention, the remaining fluorine content of $UO_2$ powder can be easily lowered by converting the dehydrated product of ADU obtained in the third step into $UO_3$ or $U_3O_8$ by reaction with only steam and then reducing the $UO_3$ or $U_3O_8$ to $UO_2$. These steps are carried out to check the formation of $UF_4$ which hinders the defluorinating reaction by making $UO_2$ not coexisit at removal of the remaining fluorine.

In the fluid bed reaction apparatus of the first step, it is effective for controlling of the particle size of $UO_2F_2$ to use a binary fluid nozzle as an atomizing nozzle of $UF_6$ gas to atmozie $UF_6$ gas from the central part of the nozzle and steam from the periphery part respectively. This is to lower a mean particle size of $UO_2F_2$ particle which is produced by reaction of $UF_6$ gas with steam near the outlet of the nozzle and becomes neucleas of pellet to form a fluid bed. The use of the binary fluid nozzle forms $UO_2F_2$ which is a fine pellet having a high reactivity to make reactions of following steps proceed quickly.

The annexed drawing is an apparatus diagram used in one following example of the present invention and corresponds to claims 1 and 3.

In the drawing, $UF_6$ is vaporized in a vaporizing chamber 1, and the $UF_6$ gas and steam are atomized into a first fluid reaction apparatus 2 through a binary fluid nozzle of the apparatus 2. At the same time, steam as a reaction gas and a fludizing gas is introduced into the bottom of the apparatus 2 from pipe 10. A part of $UF_6$ gas atomized from the center part of the binary fluid nozzle reacts immediately with steam atomized from the periphery part of the nozzle to form $UO_2F_2$ particles. A part of the formed $UO_2F_2$ particles cover the surface of $UO_2F_2$ already forming the fluid bed to make the $UO_2F_2$ grow. Further, a part of these $UO_2F_2$ particles is worn away by collison with other particles to be fine particles. The particle size of $UO_2F_2$ particle is controlled by these steps and the particles form the fluid bed.

The operating temperature of the first fluid bed reaction apparatus 2 is less than 400° C., preferably in the range of 220°-300° C. in consideration of activity of the particle and control of the particle size. Further, HF gas secondarily produced in the first fluid bed reaction apparatus 2 is recovered as a HF water solution by HF condenser 2a to be accepted by HF receiver 2b. The thus formed $UO_2F_2$ particles are overflowed from the upper part of the fluid bed to be discharged out of the apparatus 2 and are sent to a reaction apparatus 3. In the reaction apparatus 3, the $UO_2F_2$ particles are converted into ADU with ammonia water solution introduced through pipe 11. A part of these particles and the ammonia water solution are discharged from pipe 12 and is filtered by a filtering apparatus 4 to be separated to the particles and the liquid. The operating temperature of the reaction apparatus 3 is less than 90° C., preferably in the range of 10° C.-40° C. The thus obtained particles are sent to a second fluid bed reaction apparatus 5 where the particles are heated to be dried and dehydrated. Air as a fluidizing gas is introduced to the bottom of the apparatus 5 through a pipe 13. The operating temperature is less than 200° C., preferably in the range of 100° C.-180° C. The dried and dehydrated particles are overflown from the upper part and sent to a third fluid bed reaction apparatus 6, where the particles react with steam as a reaction gas and a fluidizing gas introduced to the bottom of the apparatus 6 through a pipe 14, to form $UO_3$ or $U_3O_8$. This $UO_3$ or $U_3O_8$ is similarly overflown from the upper part of the fluid bed to be sent to a fourth fluid bed reaction apparatus 7, where the $UO_3$ or $U_3O_8$ reacts with a mixed gas of steam and hydrogen gas as a reacting gas and a fluidizing gas introduced into the bottom of the apparatus 7 from 15, to form $UO_2$. The $UO_2$ powder is received as a product by a container 8. This operating temperature is less than 700° C., preferably in the range of 500° C.-600° C. in consideration of activity of the $UO_2$ powder. 16 is a waste gas treatment line.

The effects of the present invention are as follows:

(1) the $UO_2$ powder obtained has a high activity, a small remaining fluorine quantity and excellent fluidity.

Such $UO_2$ powder as that of the present invention can not be obtained by conventional process.

(2) The excellent fluidity of the $UO_2$ powder can make handling thereof in following steps very easy and can omit pelletizing operation generally carried out in manufacturing a reactor fuel.

The present invention will be understood more readily with reference to the following examples. The examples, however, are intended to illustrate the present invention and are not to be construed to limit the scope of the present invention.

EXAMPLE

This example contains a case corresponding to a first process 1 in which $UO_2F_2$ particles formed by the first fluid bed reaction apparatus react with ammonia water solution to form ADU and the ADU is reduced to $UO_2$ powder and another case corresponding to a second process in which $UO_2F_2$ particles formed by the first fluid bed reaction apparatus react with ammonia water solution to form ADU and the ADU reacts with steam to form $UO_3/U_3O_8$ powder and the $UO_3/U_3O_8$ is reduced to $UO_2$ powder. For comparisob, a comparative example in which $UO_2F_2$ particles formed by the conventional first fluid bed reaction apparatus are reduced to $UO_2$ powder is shown together in Tables 1-6.

TABLE 1

|  | Process 1 | Process 2 | comparative example |
|---|---|---|---|
| first fluid bed reaction apparatus |  |  |  |
| reaction temperature (°C.) | 280 | 280 | 280 |
| $UF_6$ supplying velocity (g/min) | 90 | 90 | 90 |
| nozzle steam supplying velocity (g/min) | 14 | 14 | 0 |
| fluidizing gas velocity (cm/sec) | 25 | 25 | 25 |
| formed $UO_2F_2$ (g/min) | 79 | 79 | 79 |
| use of binary fluid nozzle | used | used | not used |

TABLE 2

|  | Process 1 | Process 2 | comparative example |
|---|---|---|---|
| second fluid bed reaction apparatus |  |  |  |
| reaction temperature (°C.) | 10 | 10 | (not used) |
| $UO_2F_2$ supplying velocity (g/min) | 79 | 79 |  |
| product (ADU) (g/min) | 82 | 82 |  |

TABLE 3

|  | Process 1 | Process 2 | comparative example |
|---|---|---|---|
| third fluid bed reaction apparatus |  |  |  |
| reaction temperature (°C.) | 170 | 170 | (not used) |
| formed $UO_2F_2$ hydrate (g/min) | 82 | 82 |  |
| fluidizing gas velocity (cm/sec) | 30 | 30 |  |
| $UO_2F_2$ anhydride (g/min) | 76 | 76 |  |

TABLE 4

|  | Process 1 | Process 2 | comparative example |
|---|---|---|---|
| fourth fluid bed reaction apparatus |  |  |  |
| reaction temperature (°C.) | (not used) | 500 | (not used) |
| $UO_2F_2$ particle supplying velocity (g/min) |  | 76 |  |
| fluidizing gas velocity (cm/sec) |  | 20 |  |
| formed $UO_3/U_3O_8$ (g/min) |  | 73 |  |

TABLE 5

|  | Process 1 | Process 2 | comparative example |
|---|---|---|---|
| fifth fluid bed reaction apparatus |  |  |  |
| reaction temperature (°C.) | 600 | 600 | 660 |
| $UO_3/U_3O_8$ particle supplying velocity (g/min) | 76 | 73 | 79 |
| fluidizing gas velocity (cm/sec) | 20 | 20 | 20 |
| hydrogen/steam (mol ratio) | 1/1 | 1/1 | 1/1 |
| formed $UO_2$ (g/min) | 69 | 69 | 69 |

TABLE 6

|  | Process 1 | Process 2 | comparative example |
|---|---|---|---|
| property of $UO_2$ powder |  |  |  |
| bulk specific gravity (g/m$^3$) | 1.9 | 1.8 | 2.8 |
| specific surface area (m$^2$/g) | 2.9 | 3.1 | 1.0 |
| mean particle size (m) | 98 | 96 | 145 |
| U% | 87.6 | 88.0 | 87.8 |
| remaining fluorine quantity (ppm) | 43 | 38 | 276 |

Thus, as $UO_2$ powder obtained by the present invention is smaller in bulk specific gravity and particle size, larger in specific surface area, higheer in activity and smaller in remaining fluorine quantity than those of conventional process, it is suitable for manufacturing $UO_2$ pellet for a reactor fuel.

What is claimed is:

1. A process for conversion of $UF_6$ to $UO_2$ comprising the steps of
    (a) pyrohydrolizing gaseous $UF_6$ in a fluidized bed with steam to obtain $UO_2F_2$ particles at temperatures of less than about 400° C.,
    (b) reacting said $UO_2F_2$ particles with ammonia-containing solution to convert said particles to ammonium diuranate (ADU) particles at temperatures of less than about 90° C.,
    (c) drying and dehydrating said ADU particles at temperatures of less than about 200° C., and
    (d) reducing said dehydrated ADU particles with hydrogen or a mixture of hydrogen/steam to convert said particles to $UO_2$ powders at temperatures of less than about 700° C.

2. A process for conversion of $UF_6$ to $UO_2$ comprising the steps of
    (a) pyrohydrolyzing gaseous $UF_6$ in a fluidized bed with steam to obtain a $UO_2F_2$ particles at temperatures of less than about 400° C.,
    (b) reacting said $UO_2F_2$ particles with ammonia-containing solution to convert said particles to ammonium diuranate (ADU) particles at temperatures of less than about 90° C.,
    (c) drying and dehydrating said ADU particles at temperatures of less than about 200° C.,
    (d) calcining said dehydrated ADU particles with steam to convert said particles to $UO_3$ or a mixture of $UO_3/U_3O_8$ particles at temperatures of less than about 700° C., and
    (e) reducing said $UO_3$ or mixture of $UO_3/U_3O_8$ particles with hydrogen or a mixture of hydrogen/steam to convert said particles to $UO_2$ powders at temperatures of less than about 700° C.

3. The process of claim 1 or 2 in which gaseous $UF_6$ and steam are fed into a fluidized bed by using a twin fluid atomizer.

* * * * *